United States Patent
Witmann

(10) Patent No.: US 7,409,713 B2
(45) Date of Patent: Aug. 5, 2008

(54) METHOD OF PROTECTING SOFTWARE CODE

(75) Inventor: Jerome Witmann, Lens (FR)

(73) Assignee: Xtreamlok Pty. Ltd, Murarrie (AU)

( * ) Notice: Subject to any disclaimer, the term of this patent is extended or adjusted under 35 U.S.C. 154(b) by 973 days.

(21) Appl. No.: 10/724,861

(22) Filed: Dec. 2, 2003

(65) Prior Publication Data

US 2005/0120236 A1 Jun. 2, 2005

(51) Int. Cl.
*G06F 9/44* (2006.01)
*G06F 12/14* (2006.01)
*G06F 11/00* (2006.01)

(52) U.S. Cl. .............................. 726/22; 714/35; 717/127

(58) Field of Classification Search ..................... 726/22
See application file for complete search history.

(56) References Cited

U.S. PATENT DOCUMENTS

| | | | |
|---|---|---|---|
| 6,367,071 B1 * | 4/2002 | Cao et al. | 717/160 |
| 6,401,137 B1 * | 6/2002 | Wolczko et al. | 719/315 |
| 7,080,257 B1 * | 7/2006 | Jakubowski et al. | 713/187 |
| 2004/0049768 A1 * | 3/2004 | Matsuyama et al. | 717/141 |

* cited by examiner

*Primary Examiner*—Matthew Heneghan
(74) *Attorney, Agent, or Firm*—Fenwick & West LLP

(57) ABSTRACT

A method of protecting application program software includes steps of (a) actuating a tracer function to copy $2^{1 \text{ to } n}$ instructions from the API code; (b) storing and executing the instructions; and (c) returning to the next instruction $(2^{(1 \text{ to } n)+1})$ of the API code, where $2^{1 \text{ to } n}$ represents the number of instructions and n is the maximum number of instructions describing the API code.

4 Claims, 1 Drawing Sheet

Figure 1
Normal execution of an API
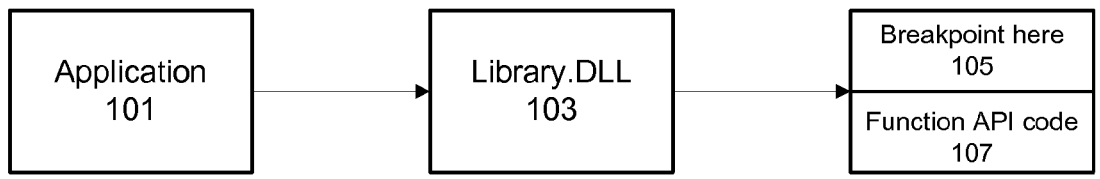
Prior Art
API Redirection
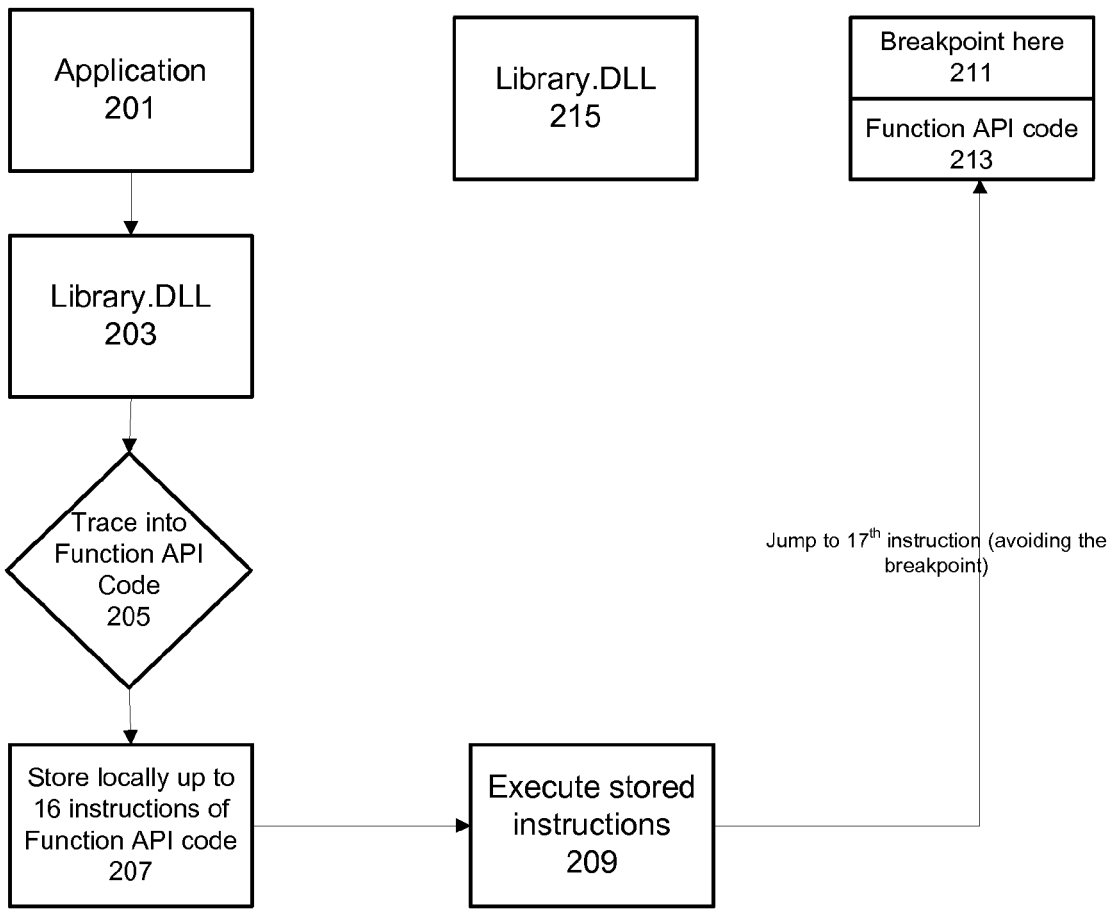
Figure 2

METHOD OF PROTECTING SOFTWARE CODE

FIELD OF INVENTION

The present invention relates to computer software and in particular software code that protects from unauthorized interruption of the execution of an application program. The present invention has particular but not exclusive application to security application programs.

PRIOR ART

Application programs including security programs utilize an application program interface (API) that allows formal requests and means of communication with the operating system and other programs. Attackers can use the API to set a break point during the execution of the application program. With a break point an attacker can halt the execution of an application and modify its behavior to produce an outcome not intended by the author.

OBJECT OF THE INVENTION

It is an object of the present invention to provide a method of protecting software code from attacks via break points placed on system API calls.

SUMMARY OF THE INVENTION

In one aspect the present invention broadly resides in a method of protecting application program software including
actuating a tracer function to copy $2^{1\ to\ n}$ instructions from the API code;
storing and executing said instructions;
returning to the next instruction $(2^{(1\ to\ n)+1})$ of the API code, wherein $2^{1\ to\ n}$ represents the number of instructions and n is the maximum number of instructions describing the API code.

Preferably the tracer function overlays the application program. The number of instructions copied may vary depending on the depth of the function API code. In one embodiment the number of instructions copied may vary between 2 and 1024 instructions. In a preferred embodiment the number of instructions is 16. The copied instructions are preferably stored in the Random Access Memory (RAM) of the CPU.

BRIEF DESCRIPTION OF THE DRAWINGS

In order that the present invention be more readily understood and put into practical effect, reference will now be made to the accompanying drawings wherein:

FIG. 1 is a diagram of the normal execution of an API; and

FIG. 2 is a diagram of the preferred embodiment of the invention.

DETAILED DESCRIPTION OF THE PREFERRED EMBODIMENT

With reference to FIG. 1, there is shown a flow diagram of the normal execution of an application program 101 where the application program 101 links to the library. DLL 103 programs which support the execution of the application program. The application program then begins executing the API code 107. Attackers using various debugging tools can place a break point 105 at the beginning of the API code 107 and stop the API calls and thus the execution of the application program 101. This has serious consequences where the application program 101 concerns the security and safety of the CPU and its data.

With reference to FIG. 2, there is shown a flow diagram of the execution of an application program 201 in the preferred embodiment of the present invention. The present invention avoids the breakpoint 211 by copying up to 16 instructions from the original API function to a local buffer by means of a tracer function. The buffered code or replicated code is executed 209 and then control is passed back to the API function 213 at the $17^{th}$ instruction. In this way any breakpoint 211 set at the beginning of the API is bypassed.

During startup of an executable (or DLL) 203, the tracer function takes control before the original entry point is reached 215. During this period it copies 207 up to 16 instructions from each protected API to a local buffer within the context of the executing application.

The tracer function achieves this by tracing 205 into the API code until it reaches the $16^{th}$ instruction 207, or until an instruction is reached which it cannot follow. An example of an instruction it cannot follow is shown below:

EXAMPLE 1 mov esi.0x00000072
mov edx. [0x12345678]
jmp edx

In the example above, the tracer has no knowledge of what edx will be set to during execution and thus aborts the trace. However, any breakpoint set on the entry point of the API will be missed.

The table below shows the difference between normal code execution and replicated code execution 209:

| Normal code flow | Replicated code flow |
| --- | --- |
| Push ebp | Push ebp |
| Mov ebp, esp | Mov ebp, esp |
| Push 0 | Push 0 |
| Push 0487654h | Push 0487654h |
| Mov fs:0, esp | Mov fs:0, esp |
| Push 12345678h | Push 12345678h |
| Push 1 | Push 1 |
| Call myfunction | Push Done |
| Done: | Push ebp |
| Ret | Mov ebp, esp |
| myfunction: | Mov eax, [ebp+8] |
| Push ebp | Mov ebx, [ebp+c] |
| Mov ebp, esp | Leave |
| Mov eax, [ebp+8] | Add esp, 08h |
| Mov ebx, [ebp+0c] | ret |
| Leave | |
| Ret 08h | |

With normal code flow, each instruction is followed stepwise until myfunction is called and the CPU locates and executes myfunction before returning to the initial instruction list. In contrast, the copied or replicated code includes the myfunction instructions per se within the copied API instructions.

A preferred embodiment of the tracer function includes:

1. Read instruction of myfunction (interpret opcodes).
2. If instruction is not ((a call, jmp, sysenter, syscall or branch instruction which ends up out of scope) or (less than the 16th instruction)) then copy to the local buffer.
3. Repeat steps 1 & 2 until out of scope.
4. Execute the local buffer.

5. Continue execution in the original myfunction code at the offset where the out of scope instruction was encountered.

The advantages of the present invention include circumventing breakpoints and avoid trying to detect them by copying and executing copied API instructions. The level of security can be increased and decreased by increasing and decreasing the number of API instructions copied and executed respectively.

It will of course be realised that while the foregoing has been given by way of illustrative example of this invention, all such and other modifications and variations thereto as would be apparent to persons skilled in the art are deemed to fall within the broad scope and ambit of this invention as is herein set forth.

Throughout the description and claims this specification the word "comprise" and variations of that word such as "comprises" and "comprising", are not intended to exclude other additives, components, integers or steps.

I claim:

1. A method of protecting application program software executing API code including:

actuating a tracer function to copy a segment of instructions from the API code until an instruction from the API code is reached that is one selected from the group consisting of a call instruction ending outside of scope, a jmp instruction ending outside of scope, a sysenter instruction, a syscall instruction, and a branch instruction ending outside of scope, or until an instruction above a predetermined number of instructions is reached, wherein the predetermined number of instructions is above two instructions;

storing and executing the copied instructions; and returning to the next instruction of the API code, wherein the next instruction of the API code is a first uncopied instruction of the API code.

2. The method of claim 1 wherein the segment of instructions is a maximum of 16 instructions and the copied instructions are stored in the Random Access Memory (RAM) of the CPU.

3. The method of claim 1 wherein the application program software is security program software.

4. The method of in claim 1 wherein the tracer function includes the following instructions:

read instruction of myfunction (interpret opcodes);

if instruction is not ((a call, jmp, sysenter, syscall or branch instruction which ends up out of scope) or (less than the $16^{th}$ instruction)) then copy to the local buffer;

repeat above steps until out of scope;

execute the local buffer;

continue execution in the original myfunction code at the offset where the out of scope instruction was encountered.

* * * * *

UNITED STATES PATENT AND TRADEMARK OFFICE
CERTIFICATE OF CORRECTION

PATENT NO. : 7,409,713 B2 Page 1 of 1
APPLICATION NO. : 10/724861
DATED : August 5, 2008
INVENTOR(S) : Jerome Witmann It is certified that error appears in the above-identified patent and that said Letters Patent is hereby corrected as shown below:

On Column 4, line 15, delete "in"

Signed and Sealed this

Eighteenth Day of November, 2008

JON W. DUDAS
*Director of the United States Patent and Trademark Office*